(12) United States Patent
Arseneau

(10) Patent No.: US 9,152,521 B2
(45) Date of Patent: Oct. 6, 2015

(54) SYSTEMS AND METHODS FOR TESTING CONTENT OF MOBILE COMMUNICATION DEVICES

(75) Inventor: Eric Jean-Paul Arseneau, San Diego, CA (US)

(73) Assignee: ASSET SCIENCE LLC, Santa Ana, CA (US)

( * ) Notice: Subject to any disclaimer, the term of this patent is extended or adjusted under 35 U.S.C. 154(b) by 506 days.

(21) Appl. No.: 13/043,869

(22) Filed: Mar. 9, 2011

(65) Prior Publication Data

US 2012/0230587 A1 Sep. 13, 2012

(51) Int. Cl.
- *G06K 9/62* (2006.01)
- *G06K 9/00* (2006.01)
- *G06F 11/277* (2006.01)

(52) U.S. Cl.
CPC .................................. *G06F 11/277* (2013.01)

(58) Field of Classification Search
None
See application file for complete search history.

(56) References Cited

U.S. PATENT DOCUMENTS

| | | | | |
|---|---|---|---|---|
| 6,477,266 | B1* | 11/2002 | Asar | 382/147 |
| 7,574,591 | B2* | 8/2009 | Downer et al. | 713/1 |
| 8,712,967 | B1* | 4/2014 | Weaver et al. | 707/645 |
| 2007/0192739 | A1* | 8/2007 | Hunleth et al. | 715/823 |
| 2008/0134045 | A1* | 6/2008 | Fridman et al. | 715/735 |
| 2010/0274755 | A1* | 10/2010 | Stewart | 706/54 |
| 2011/0029635 | A1* | 2/2011 | Shkurko et al. | 709/217 |
| 2013/0103665 | A1* | 4/2013 | Kasterstein et al. | 707/706 |

OTHER PUBLICATIONS

The International Search Report and the Written Opinion, the International Searching Authority, Jun. 1, 2012 corresponding PCT Application PCT/CA2012/000186.

* cited by examiner

*Primary Examiner* — Thomas Conway

(57) ABSTRACT

The embodiments described herein relates to systems and method for testing user content of given mobile communication devices. According to one aspect, there is provided a method for testing user content of given mobile communication devices that includes the steps of providing at least one model image associated with at least one graphical user interface ("GUI") screen of a model mobile communication device corresponding to the given mobile communication device, obtaining at least one test image associated with at least one GUI screen of the given mobile communication device, comparing the test image with the model image, and determining whether the user content of the given mobile communication device is different from the desired content of the model mobile communication device.

19 Claims, 8 Drawing Sheets

SYSTEMS AND METHODS FOR TESTING CONTENT OF MOBILE COMMUNICATION DEVICES

TECHNICAL FIELD

The invention relates to mobile communication devices, and in particular to systems and methods for testing user content of mobile communication devices, such as mobile phones.

BACKGROUND

Use of mobile communication devices is prevalent in society today. These devices store, display and manipulate information. Generally, the mobile communication devices being delivered to end-users contain standard preset information. End-users then customize the device according to their preferences by storing additional personal information (e.g. adding a personal phonebook) or manipulating the factory preset information (e.g. replacing the factory wallpaper with a personal photo). As such, each device, over time, will store personal information about the user of the device.

Over a period of time, the device storing the user's personal information may be reassigned, passed-on, or otherwise repurposed for a variety of reasons. For example, the user may have decided to upgrade to a newer mobile communication device, or the device may need to be repaired. The used devices with the user's personal information may be repurposed, repaired, refurbished and provided to another user.

In order to repurpose, repair, or refurbish used mobile communication devices, it is generally required that any personal data and customizations be removed, and the content of the device reset to contain only the standard preset desired information such that any personal information and customizations stored therein are not apparent to the next user. In many devices, the original equipment manufacturer (OEM) will provide a software tool, either on the device itself or through an external source, to reset the content of the device to standard factory preset information. This functionality is sometimes referred to as a "factory-reset". The factory-reset of a mobile communication device has two purposes: firstly, to ensure that private personal content is not transferred to another user, and secondly, to provide the next recipient of device with a user experience similar to that of interacting with the content of a new phone. However, the factory-reset function may not always successfully remove all customization and personal information. For example, the factory-reset software may only remove personal data and customization in memory that are normally accessible through supported customization means and overlook the user content forced on the phone through various cracks, hacks or other non-OEM supported means.

As the number of reused mobile communication devices and the value of personal data and privacy increases, there is a need for a system and method to verify user-accessible user content of a second-hand mobile communication device to determine whether it is free from user customizations and personal data from the device's previous owner.

SUMMARY OF THE INVENTION

According to one aspect, there is provided a computer-implemented method for testing user content of a given mobile communication device. The method includes the steps of providing at least one model image associated with at least one graphical user interface ("GUI") screen of a model mobile communication device corresponding to the given mobile communication device, obtaining at least one test image associated with at least one GUI screen of the given mobile communication device, comparing the test image with the model image, and determining whether the user content of the given mobile communication device is different from the desired content of the model mobile communication device. The model mobile communication device has desired content stored therein, and the at least one model image includes information about a plurality of pixels of the at least one GUI screen and is indicative of the desired content of the model mobile communication device. The test image includes information about a plurality of pixels of the least one test image and is indicative of the user content of the given mobile communication device.

According to another aspect, there is provided a system for testing user content of a given mobile communication device having at least one data storage device and at least one processor coupled to the data storage device. The data storage device includes a test agent having test agent instructions, and at least one model image associated with at least one graphical user interface (GUI) screen of a model mobile communication device corresponding to the given mobile communication device, the model communication device having desired content stored therein, and the model image comprising information about a plurality of pixels of the at least one GUI screen and being indicative of the desired content of the model mobile communication device. The at least one processor is adapted to execute the test agent instructions such that the at least one processor is operable to obtain at least one test image associated with at least one GUI screen of the given mobile communication device, the test image comprising information about a plurality of pixels of the least one test image and being indicative of the user content of the given mobile communication device, compare the test image with the model image, and determine whether the user content of the given mobile communication device is different from the content of the model mobile communication device.

According to another aspect, there is provided a non-transitory computer readable medium storing instructions for testing user content of a given mobile communication device. The instructions are executable by at least one processor to provide at least one model image associated with at least one graphical user interface (GUI) screen of a model mobile communication device corresponding to a given mobile communication device, obtain at least one test image associated with at least one GUI screen of the given mobile communication device, compare the test image with the model image and determine whether the user content of the given mobile communication device is different from the desired content of the model mobile communication device. The model mobile communication device includes desired content stored therein, and the model image includes information about a plurality of pixels of the at least one GUI screen and is indicative of the desired content of the model mobile communication device. The test image includes information about a plurality of pixels of the at least one test image and is indicative of the user content of the given mobile communication device.

Other aspects and features of the invention will become apparent, to those ordinarily skilled in the art, upon review of the following description of some exemplary embodiments.

BRIEF DESCRIPTION OF THE DRAWINGS

The drawings included herewith are for illustrating various examples of methods and apparatus of the present specification and are not intended to limit the scope of what is taught in any way. In the drawings.

DETAILED DESCRIPTION OF THE INVENTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a mainframe computer, server, personal computer, laptop, personal data assistant, slate/tablet/pad-form computers, smart phone, or cellular telephone. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Figure 1:
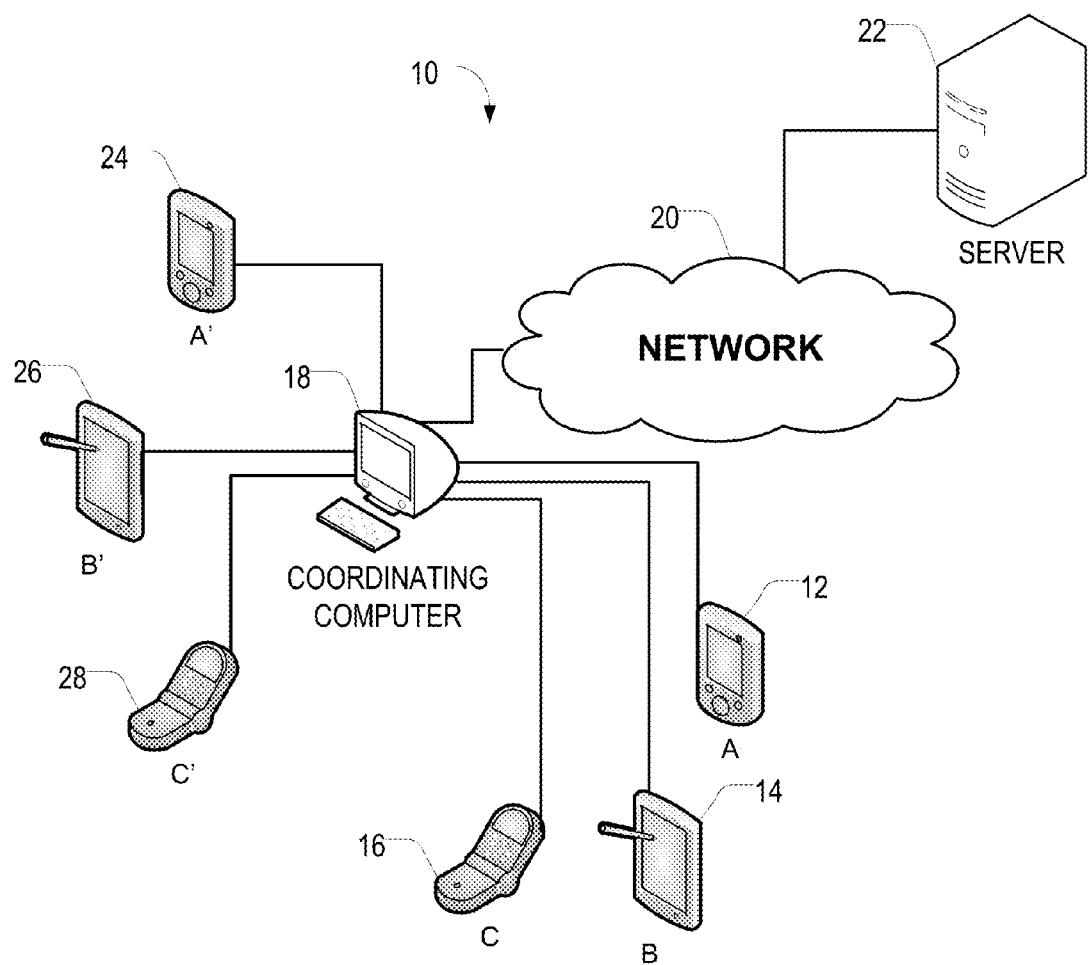
FIG. 1 is a schematic diagram of a system for testing user content of given mobile communication devices according to one embodiment of the invention.

Referring to FIG. 1, illustrated therein is a system 10 for testing user content of given mobile communication devices 12, 14 and 16. Mobile communication devices will sometimes be referred to herein as "the device(s)". The system 10 comprises a coordinating computer 18, which is connected to a network 20, and through the network 20 to a server 22. The coordinating computer 18 is also shown connected to a type "A'" model device 24, a type "B'" model device 26, and a type "a'" model device 28.

The given devices 12, 14 and 16 are mobile communication devices, which for example without limitation, may be cellular phones, smart phones, tablet/slate computers, and eBook readers. These devices 12, 14, and 16 could be refurbished, used, repurposed, reassigned, repaired and there is a risk that the user content of these devices includes undesired information such as personal data or customization data. The user content of these given devices 12, 14, and 16 are to be contrasted against the desired content of the model devices 24, 26, and 28 to determine whether they contain undesired information so that the next user of the given devices 12, 14, 16 will likely not experience or encounter undesired information.

As shown, the mobile communication 12 is a smart phone of type "A", device 14 is a tablet computer of type "B", and device 16 is a smart phone of type "C". The devices 12, 14 and 16 may be running various operating systems, which may be model-specific, manufacturer-specific (e.g. iOS developed by Apple Computer Inc.), or operating systems that are not restricted to a particular device or a manufacturer (e.g. Android operating system developed by Google Inc.).

Each of the mobile communication devices 12, 14, 16, 24, 26 and 28 is shown connected to the coordinating computer 18. The connection between each of the devices 12, 14, 16, 24, 26 and 28 and the coordinating computer 18 may be wired or wireless. The connection may be facilitated through Universal Serial Bus ("USB"), IEEE 802.11 standard ("WiFi"), BlueTooth™, cellular data network, infrared, IEEE 1394 interface or any other data communication means.

Figure 2:
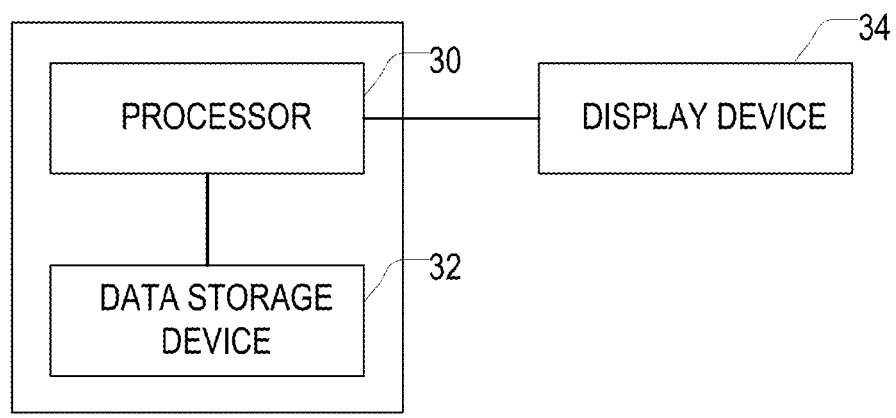
FIG. 2 is a schematic diagram of hardware modules of one of the given and model mobile communication devices shown in FIG. 1.

Referring to FIG. 2, illustrated therein is a schematic diagram of exemplary hardware modules of a mobile communication device such as the devices 12, 14, 16, 24, 26, and 28. Each of the devices 12, 14, 16, 24, 26, and 28 comprises a data storage device 32 and a processor 30 coupled to the data storage device 32. As shown the processor is also coupled to a display device 34. The display device 34 may be the display device of the mobile communication devices 12, 14, 16, 24, 26, and 28.

Each of the mobile communication devices 12, 14, 16, 24, 26, and 28 is operable to generate graphical user interface screens that are displayable on a display device such as the display device 34. These GUI screens can be used by a user of the device to interact with the devices. Generally, the GUI screens are generated based on a combination of the operating system of the device and the personalized content or customization provided by the user. For example, the background of a GUI screen may be a wallpaper image provided by the manufacturer of the device 12, 14, 16, 24, 26, and 28 (i.e. default wallpaper) or it may be customized to display a photograph taken by the user of a particular device. Similarly, aspects of various GUI screens may be personalized by a user to better fit his/her usage requirements or preferences. The GUI screens may also reflect personalized content stored in the device. For example, a GUI screen displaying a phone book entry may display a name and contact information of an acquaintance of the user.

Generally, any personal information or customization stored in the mobile communication devices 12, 14, 16, 24, 26, and 28 would be reflected in a GUI screen in one format or another such that the stored information is retrievable or accessible to the user. As such, the GUI screens generated by the mobile communication devices 12, 14, 16, 24, 26, and 28 are indicative of the content, including user content, of the devices from the perspective of the user. If the undesired content is not reflected in any of the GUI screens generated by the devices 12, 14, 16, 24, 26, and 28, then the existence of undesired content will not be perceived by the end-user. That is, if the user does not experience the undesired content, it will be irrelevant from the perspective of the user even if such undesired content exist on the devices 12, 14, 16, 24, 26, and 28.

Accordingly, accessing and examining the entire file system of each the given mobile communication devices 12, 14, and 16 is not necessary to ensure that a user will not experience unauthorized content. Instead, the graphical interface (GUI screens) generated by the device 12, 14, and 16 can be verified to ensure that the content on digital-device is as intended. This represents a user-centric approach to testing and verifying the user content of the mobile communication devices 12, 14, and 16, and is distinguishable from other systems and methods that test various parts of file system or memory content.

Referring back to FIG. 1, the server 22 may be a web server connectable to the coordinating computer 18 through the Internet. In some embodiments, the server 22 may be a cloud service. The server 22 contains model images associated with GUI screens of the model devices 24, 26 and 28. Each of the model images comprises information about a plurality of pixels of a particular GUI screen. For example, the image file might contain information about the colour and intensity to be displayed at each pixel of the image. The model image may be saved as an image format file. An image format file, for example and without limitation, may be JPEG, BITMAP, and/or TIFF format files.

As described above, the model images are indicative of the content of model devices 24, 26 and 28. Since the model devices 24, 26, and 28 contain only the desired content, the model images are viewed as the "golden" standard against which the images of the GUI screens of the given devices 12, 14, and 16 are measured.

The desired content may be factory-set standard content that is provided to end-users. The desired content may also include customizable content that is provided to end-users. For example, wireless service providers may wish to provide customized company interface to their subscribers on the devices 12, 14, 16, 24, 26, and/or 28 registered with the service providers. Generally, the desired content will not include any personal data.

Figure 3:
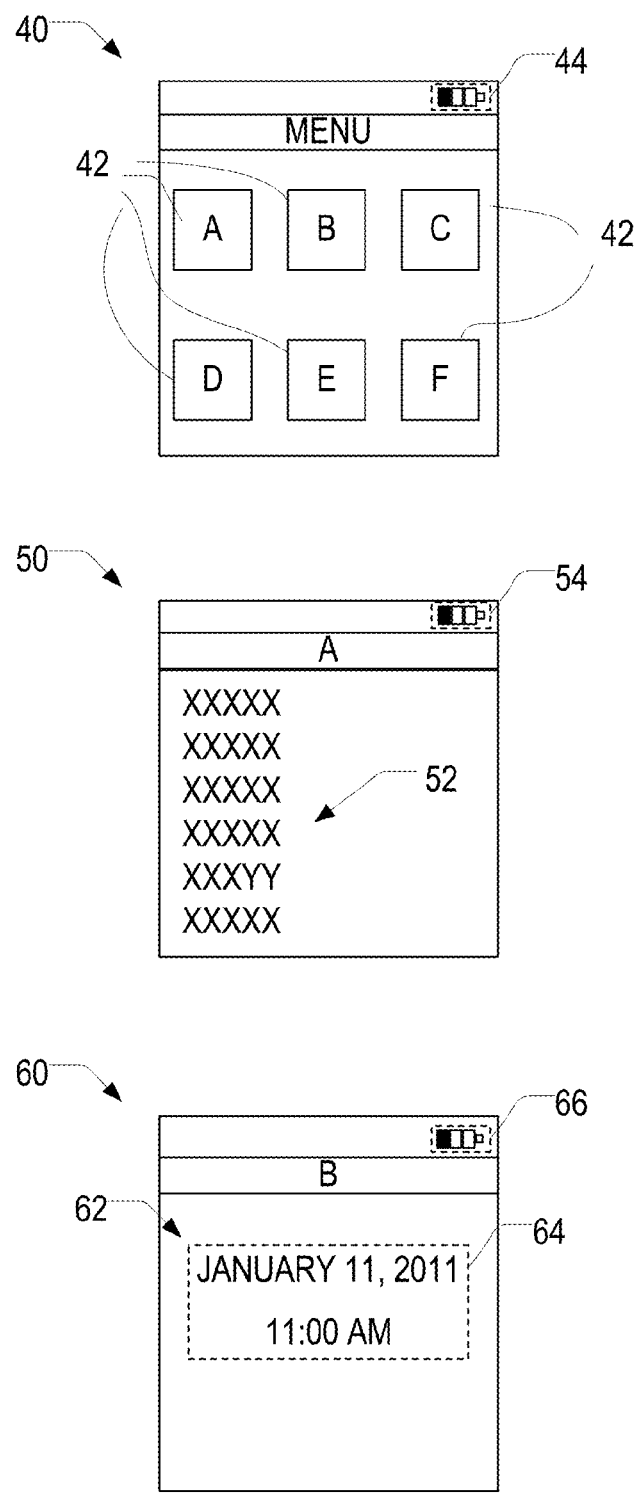
FIG. 3 is a schematic diagram of exemplary model images of graphical user interface ("GUI") screens of one of the model mobile communication devices shown in FIG. 1.

Referring now to FIG. 3, illustrated therein are three exemplary model images 40, 50 and 60 representing three GUI screens of one of the model devices 24, 26 and 28. The model image 40 depicts a main-menu GUI screen with menu icons 42. Each of the icons 42, when selected will lead to a sub-menu.

The model image 40 also includes an exclude portion 44 directed to the battery life indicator. The exclude portion 44 defines a portion of the model image 40 that is immaterial to testing the user content of the given mobile communication device 12, 14, and 16. For example, the battery life of the device 12, 14, 16, 24, 26, or 28 when the image was generated is immaterial to verify the user content of that device.

The model image 50 depicts the GUI screen when the icon "A" shown in the model image 40 is selected. The model image 50 shows lines of text generally indicated by the reference numeral 52. These lines of text, for example, may represent personal information or device customization settings.

The model image 60 depicts the GUI screen when the icon "B" shown in the model image 40 is selected. The model image 60 shows a time and a date, as generally indicated by the reference numeral 62 that was displayed on the GUI screen when the image was generated. The model image 60 also includes a variable portion 64. The variable portion 64 is a portion of the model image that varies based on the context surrounding the generation of that image. The variable portion 64 in this image is directed to the time and date 62 since the variable context in this image when the image was generated. Generally, the variable portion of a model image is allowed to be different from a corresponding variable portion of a test image obtained from one of the given mobile communication devices 12, 14, and 16 since the variable portion does not reflect personal information or customization. The variable portion 64, for example and without limitation, may include mobile network operator/carrier information, branding information, and/or configuration information (e.g. specific network routing information for a given carrier).

The model images 40, 50, and 60 illustrated in FIG. 3 are only for illustrative purposes. Generally, each type of mobile communication device will have a plurality of model images associated with the device. The model images may be obtained, for example, by executing at least some of the steps of a method 200 illustrated in FIG. 8 and described herein below on the model devices 24, 26 and 28.

A set of model images for each type (e.g. "A", "B", and "C") of given mobile communication devices 12, 14, and 16 is provided. In some embodiments, the set of model images may be generated from the model devices 24, 26, 28 connected to the coordinating computer 18. In some embodiments, some of the model images may have been generated previously and/or stored in the coordinating computer 18 or the server 22. After connecting to one of the given devices 12, 14, and 16 to be tested, a set of model images corresponding to that device can then be retrieved from the coordinating computer 18 or the server 22.

In some embodiments, when one of the given devices 12, 14, and 16 is connected to the coordinating computer 18, the coordinating computer 18 might determine the type of the given device that is connected (e.g. device types "A", "B", or "C") and whether there is a corresponding set of model images for that type of device stored in the coordinating computer 18 or at the server 22. If the set of model images are stored in the server 22, the coordinating computer 18 may request a copy of the model images from the server 22.

Figure 4:
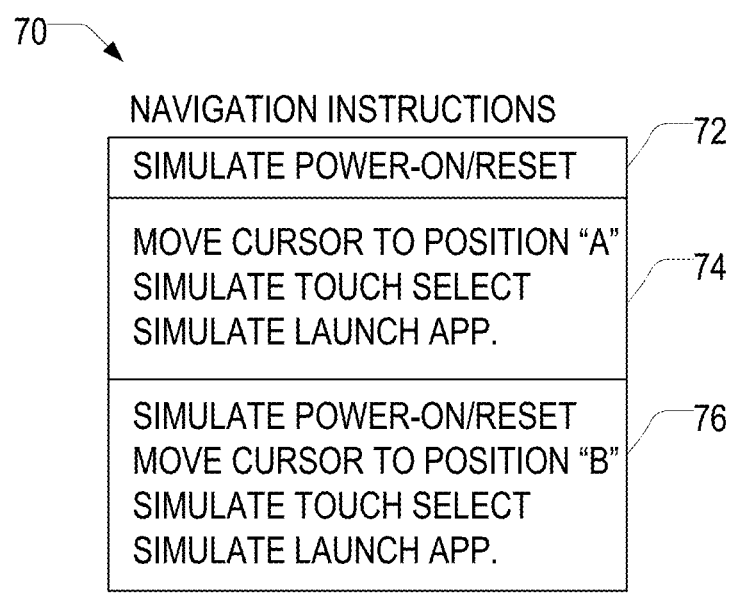
FIG. 4 is a block diagram of exemplary navigation instructions that may be executed to navigate through GUI screens of one of the given mobile communication devices shown in FIG. 1.

In addition to the set of model images for each type of the given mobile communication devices 12, 14, and 16 to be tested, a set of navigation instructions for each type of the given devices 12, 14, and 16 may also be provided to the coordinating computer 18. The navigation instructions for the given devices 12, 14, and 16 comprise instructions to navigate through the graphical user interface of the devices 12, 14, and 16 to arrive at desired GUI screens. Referring to FIG. 4, illustrated therein is a block diagram of a part of exemplary set of navigation instructions 70. The navigation instructions 70 simulate a user navigating the screen of one of the given devices 12, 14, and 16 to traverse through a plurality of GUI screens on that device.

The navigation instructions 70 include an initial power/on reset instruction 72, which could be used to get to the main-menu/home-menu of the graphical user interface. This instruction, when executed by a processor coupled to one of the devices 12, 14, and 16, navigates that device to a "home" or "root" GUI screen. For example, the start screen could be the main menu GUI screen captured in model image 40 described above.

The navigation instructions 70, for example, may include instructions to simulate user interaction with one of the devices 12, 14, and 16, such as instruction 74. Instruction 74, when executed by a processor coupled to that device, will move the cursor to position "A", at which the icon "A" is located on the main menu 40. The Instruction 74, then simulates select and launch application such that icon "A" is launched and a GUI screen corresponding to that icon, such as the GUI screen captured in the model image 50 is generated.

The navigation instructions 70, may also include instruction 76 to generate a GUI screen corresponding to icon "B". For example, the GUI screen for icon "B" could be the GUI screen captured in the model image 60 shown in FIG. 3.

In some embodiments, the navigation instructions may be different from the instructions 70 shown in FIG. 4. The instructions may directly access the GUI screens from a system level rather than from user level. For example, the navigation instructions may comprise instructions to launch particular menus without having to simulate movement of the cursor (e.g. using command prompt/system level commands).

In some embodiments, the instructions 70 may be generated by recording the steps a user would perform on the model device 12, 14 and 16 to access a plurality of GUI screens.

In some embodiments, the instructions 70 may be generated from meta data description of the digital device. The meta data description of the device could contain information about the layout of the icons, buttons, controls, GUI screens and other information about the device.

Referring back to FIG. 1, the coordinating computer 18 connects to each of the given mobile communication devices 12, 14, and 16 to be tested. For each device 12, 14, and 16, it determines the type (e.g. make and model) of the device and retrieves a corresponding set of model images for that device. In some embodiments, a test agent comprising a set of test agent instructions corresponding to each device 12, 14, and 16 is also determined.

The coordinating computer 18 determines whether a test agent is to be provided to the data storage device coupled to each of the given devices 12, 14, and 16. The test agent includes test agent instructions executable by a processor coupled to the given devices 12, 14, and 16 or the model devices 24, 26 and 28 (e.g. processor 30) to adapt the processor to implement one or more of the steps of one or more of the methods 100, 150 or 200 illustrated in FIGS. 5, 6, and 8 and described below. The test agent may be removed after execution of the one or more methods 100, 150, 200.

The coordinating computer 18 also determines a type of device for each of the connected given devices 12, 14, and 16 and whether a corresponding set of model images and/or navigations instructions are available for that type of device. The coordinating computer 18 may obtain the corresponding set of model images and navigation instructions from the server 22 over the network 20 if it is not already provided to the coordinating computer 18.

In some embodiments, the coordinating computer 18 may be a mobile communication device. That is, the coordinating computer 18 need not be a desktop computer. In some embodiments, the coordinating computer 18 may be one of the given mobile communication devices 12, 14, and 16 to be tested.

In some embodiments, the coordinating computer 18 need not be connected to the network 20 or the server 22. The necessary model images, navigation instructions 70 and/or the test agent may be stored in a data storage device of the coordinating computer 18.

In some embodiments, the test agent may reside on the data storage device of the coordinating computer 18 and transmitted to the processor of one of the given devices 12, 14, and 16 via wired or wireless data communication means for execution.

In some embodiments, the test agent may be transferred to the data storage device on one of the mobile communication devices 12, 14, and 16, the data storage device being coupled to the processor of the device.

In some embodiments, the coordinating computer 18 could provide the test agent comprising instructions executable by a processor to perform one or more steps associated with the methods 100, along with the corresponding set of model images and navigation instructions to each of the given devices 12, 14, and 16 to determine whether the content of each of the given devices 12, 14, and 16 differs from that of the corresponding model devices 24, 26, and 28. After the test agent instructions are executed and the outcome is recorded, the test agent may be removed from the data storage device coupled to the given device 12, 14, or 16.

In some embodiments, a unique identifier may be associated with each given device 12, 14, or 16. The unique identifier may be used to uniquely identify the particular given device 12, 14, or 16 and a particular set of test results.

Figure 5:
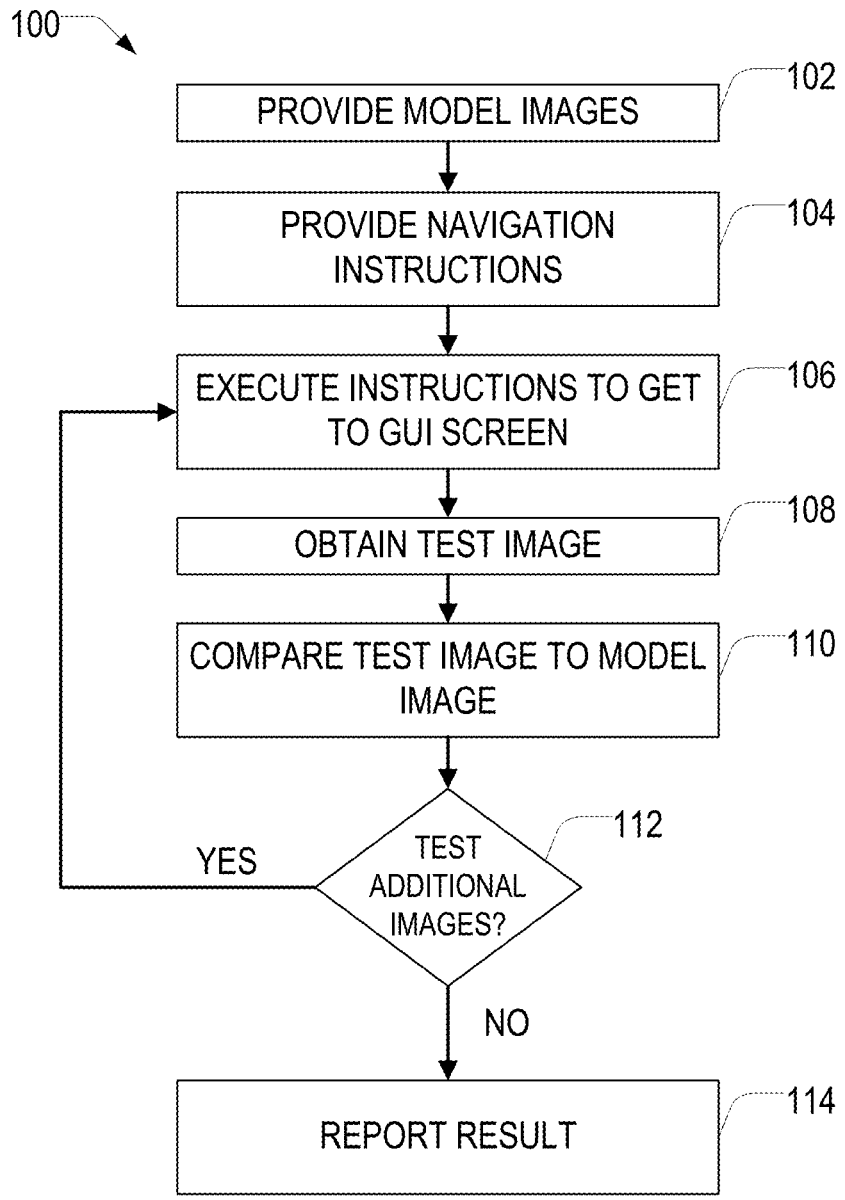
FIG. 5 is a block diagram of a method for testing user content of a given mobile communication device according to another embodiment of the invention.

Referring now to FIG. 5, illustrated therein is a computer-implemented method 100 for testing user content of a given mobile communication device according to another embodiment of the invention. The method 100 may be executed by a processor on a mobile communication device such as one of the given mobile communication devices 12, 14, and 16 illustrated in FIG. 1 and described herein above.

The method 100 starts at step 102, wherein model images associated with GUI screens of a model mobile device corresponding to the given mobile communication device are provided. The model mobile device is corresponding to the given mobile device if the model mobile device has the same or similar GUI screens as the given mobile device. For example, the model device may be the same make, model, and/or have the same operating system as the given device. The model mobile communication device has desired content stored therein. Each of the model images comprises information about a plurality of pixels of a corresponding GUI screen. The model images, individually or collectively, are indicative of the desired content of the device that can be experienced by a user of the device. The model images, for example and without limitation, may be the model images 40, 50, 60 illustrated in FIG. 3 and described above.

In some embodiments, the step 102 of method 100 may comprise one or more of the steps of method 200 illustrated in FIG. 8 and described below to obtain a set of model images from the model mobile communication device. In some embodiments, the model images may be obtained from a server or a coordinating computer over a network.

At step 104, navigation instructions corresponding to the given mobile communication device are provided. In some embodiments, navigation instructions might not be necessary. For example, if only one image is being compared, then navigation instructions may not be necessary. The navigation instructions, for example and without limitation, could be navigation instructions 70 illustrated in FIG. 4, and described herein above.

At step 106, the navigation instructions are executed to get to a GUI screen of the given device to be tested.

At step 108, a test image associated with that GUI screen of the given device is obtained. This may involve executing a "screen capture" of the associated GUI screen.

At step 110, the test image obtained in step 108 is compared with a corresponding model image from the model images provided in step 102. In some embodiments, one or more of the steps of the method 150, illustrated in FIG. 6 and described herein below, may be executed to compare the test image to the model image. In other embodiments, other methods of comparing the images may be used.

At step 112, it is determined whether additional GUI screens on the given device should be tested. In some embodiments, the navigation instructions may be examined to determine whether there are additional GUI screens to be tested. In other embodiments, the number of model images in the set of model images provided in step 102 could be used to determine whether there are additional GUI screens to be tested. In some embodiments, the outcome of the comparison in step 110 could be used to determine whether additional images should be tested. For example, if the outcome of the comparison of the model image to the test image indicates that the user content of the given device and the test device is different, then the method 100 will not continue to test additional GUI screens. If it is determined that additional GUI screens should be tested, the method returns to step 106. If there are no additional GUI screens to be tested, the method proceeds to step 114.

At step 114, result of the comparisons between the test images and the model images are compiled, recorded and/or reported.

In some embodiments, a unique identifier associated with the given device could be recorded along with the result.

In some embodiments, the results of the determination could be presented graphically. The results may include the pass/fail status of each test performed.

In some embodiments, the results could be reported to the coordinating computer or a server.

In some embodiments, the method may further comprise uninstallation of testing agent instructions if the testing instructions were provided to the given device. In some embodiments, the testing agent may be used to communicate information to a user of the device.

In some embodiments, depending on the circumstances, one or more of the steps of the method 100 may be omitted.

Figure 6:
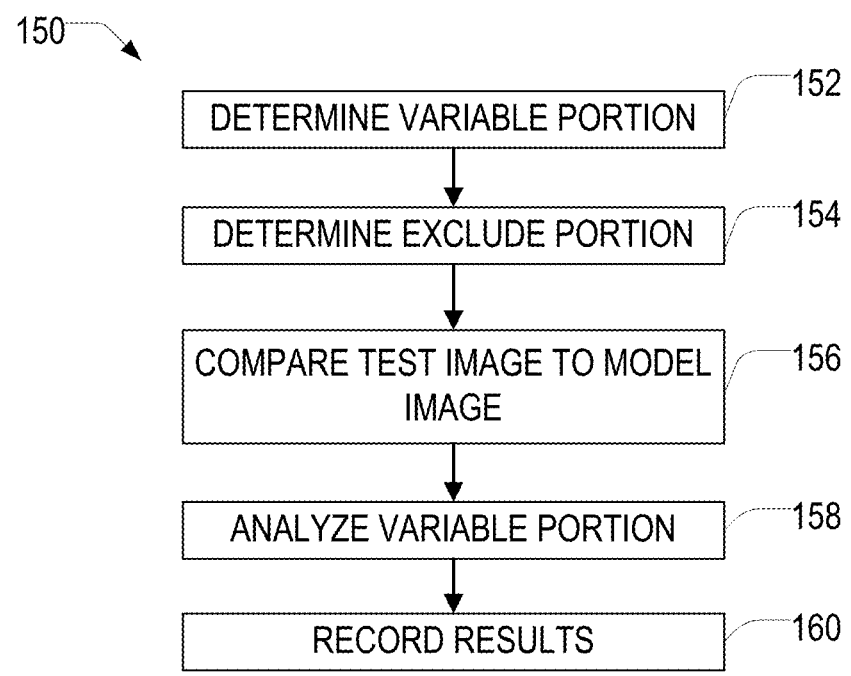
FIG. 6 is a block diagram of a method for comparing a test image to a model image that may be executed by a processor of a mobile communication device shown in FIG. 1.

Referring now to FIG. 6, illustrated therein is an exemplary method 150 for comparing a test image to a model image. One or more of the steps of method 150 may be executed by the method 100 or be provided to a given mobile communication device shown in system 10 to compare a test image to a model image. The method 150 begins at step 152.

At step 152, a variable portion that varies based on context of the test image is determined. The variable portion is a portion of the image that may vary based on the context surrounding the generation of the image. In some embodiments, the variable portion of the test image may be determined by examining a corresponding variable portion of the model image. For example, if it is determined that a portion of the model image represented by pixels X is variable, then similar pixels X on the test image may be deemed to be variable. In other embodiments, other methods may be used to determine the variable portion of the test image.

At step 154, an exclude portion of the test image that is immaterial to test the user content associated with the test image is defined. The exclude portion is generally a portion of the image that is immaterial to the testing of the user content of the given device. In some embodiments, the exclude portion may be determined by examining a corresponding exclude portion of the model image. For example, if it is determined that a portion of the model image represented by pixels X is to be excluded, then similar pixels X on the test image may be deemed to be excluded. In other embodiments, other methods may be used to determine the exclude portion of the test image.

In some embodiments, determination of the variable and/or exclude portions in steps 152 and/or 154 are performed without requiring user input. In other embodiments, the determinations of the variable and/or exclude portions in steps 152 and/or 154 are based on user input.

In some embodiments, once the variable and/or exclude portions are determined, the information about the pixels in these portions may not be recorded, or set to a particular value. For example, the portions may be "whited-out" or "blacked-out". This may reduce memory space required to save that model image. This may also reduce processing resources required to compare the excluded portion to a corresponding portion of a test image. For example, when comparing a test image to a model image having a whited-out portion, a corresponding portion in the test image could be whited-out as well. This permits comparison of the images in their entirety rather than comparing just the non-whited out pixels.

In some embodiments, the method 150 may not include steps 152 and 154. For example, if the model image does not indicate any exclude or variable portion, then the method 150 will not include steps 154 or 156 to define a variable portion or an exclude portion of the corresponding test image. After steps 152 and/or 154 are executed, or if steps 152 and/or 154 are not performed, the method 150 proceeds to step 156.

At step 156, the test image and the model image are compared. There are a number of methods for comparing the images. For example, a hash value may be calculated from the data associated with each of the test image and the model image and then compared. If a same value is generated from both images, then the images can be said to be identical. However, if the hash value of the test image is different than the hash value of the model image, then the images can be said to be different.

The hash function may also be advantageous in that it is not possible to reproduce how the GUI screen looks like from the hash value, which encourages privacy of the user contents of the given device. However, using a hash function as described above provides a binary (identical/not-identical) outcome.

A pixel-by-pixel comparison method could be used to determine which portion of the images is different. Each of the images comprises information about a plurality of pixels of an associated GUI screen. For each pixel of the plurality of pixels in the test image, information about that pixel could be compared to the information about a corresponding pixel of the plurality of pixels in the model image. By performing a pixel-by-pixel comparison, it is possible to determine which of the pixels are different if there are different pixels.

Some of the pixels of the test image or the model image may be noted to indicate the different pixels between the test image and the model image. For example, a shape could be drawn around a portion of the image to indicate the existence of different pixels within that portion.

If a variable portion and/or exclude portion are defined, then information associated with these portions is disregarded or ignored when the comparison is performed.

After the test image is compared to the model image at step 156, the method proceeds to step 158.

At step 158, the variable portion of the test image defined in step 152 of the method 150 is analyzed. Since the variable portion of the test image is reflective of the context when the test image was generated, it is possible to analyze the context by examining the test image. In some embodiments, the variable portion may have one or more test functions associated with the variable portion. The test function is indicative of a type of analysis to be performed on the variable portion to analyze information contained therein. For example, the test function could be an optical character recognition (OCR), which could be applied to extract information from the variable portion of the test image and determine whether the extracted information is desired. For example, the time and date of when the test image was obtained could be compared against the time and date displayed on the test image to determine whether the device is accurately display in the current time and date. In other embodiments, other analyzing means may be used to examine and analyze the variable portion of the test image.

At step 160, the results of the comparison, are recorded. The results, for example and without limitation, may include the result of the comparison at step 156, and/or result of the variable portion analysis at step 158.

An exemplary operation of the method 100 for testing user content of a given mobile communication device will now be described with reference to FIGS. 3, 4, 5, 6 and 7.

The method 100 provides model images that correspond to the given mobile communication device as shown in step 102 of FIG. 5. In this example, the model images are images 40, 50, and 60 as shown in FIG. 3 associated with three GUI screens of a model mobile communication device corresponding to the given device. Each of the model images 40, 50, and 60 comprises information about a plurality of pixels of the corresponding GUI. As shown, the model image 40 comprises icons 42 and an exclude portion 44. The model image 50 comprises lines of text as generally indicated by reference numeral 52 and an exclude portion 54. The model image 60 comprises a variable portion 64 and an exclude portion 66.

In the current example, the method 100 also provides navigation instructions 70 at step 104, as shown in FIG. 4, to navigate the GUI screens of the given device. The navigation instructions 70 comprise instructions 72 to get to the "home" screen on the given device, instructions 74 to select and execute icon "A" of the home screen, and instruction 76 to select and execute icon "B" of the home screen.

After receiving the navigation instructions 70 and the model images 40, 50, and 60, the method 100 executes the navigation instruction 72 on a processor coupled to the given device to generate a GUI screen, at step 106. In the current example, the generated GUI screen is the GUI screen captured in a test image 82 illustrated in FIG. 7.

After executing the navigation instruction 72 to generate the GUI screen, the method 100 obtains a test image of that GUI screen at step 108. The resulting test image, in the current example, is the test image 82 illustrated in FIG. 7. The test image 82 comprises information about a plurality of pixels and is indicative of at least some of the user content of the given device.

After obtaining the test image 82, the test image 82 is compared to the model image 40 at step 110. As the model image 40 comprises an exclude portion 44, a corresponding exclude portion 83 on the test image 82 is determined. The excluded portions 44 and 83 are disregarded or ignored when the two images 40 and 82 are compared. That is, even though the pixels corresponding to the battery life indicator on the images 40 and 82 are different, the comparison will not indicate that the images are different because the battery life indicator is within the exclude portion 44 and 83 respectively. The result of the comparison is recorded.

After recording the results of the comparison, the method 100 determines at step 112 whether there are additional screens to be obtained. Since there are model images 50 and 60 that have yet been compared to a corresponding test image, the method 100 returns to step 106, whereby another set of navigation instructions are executed to generate a second GUI screen on the given device. Staying with the present example, the navigation instructions 72 are executed on the given device to generate the second GUI screen at step 106. The second GUI screen is the GUI screen captured in a test image 84.

Figure 7:
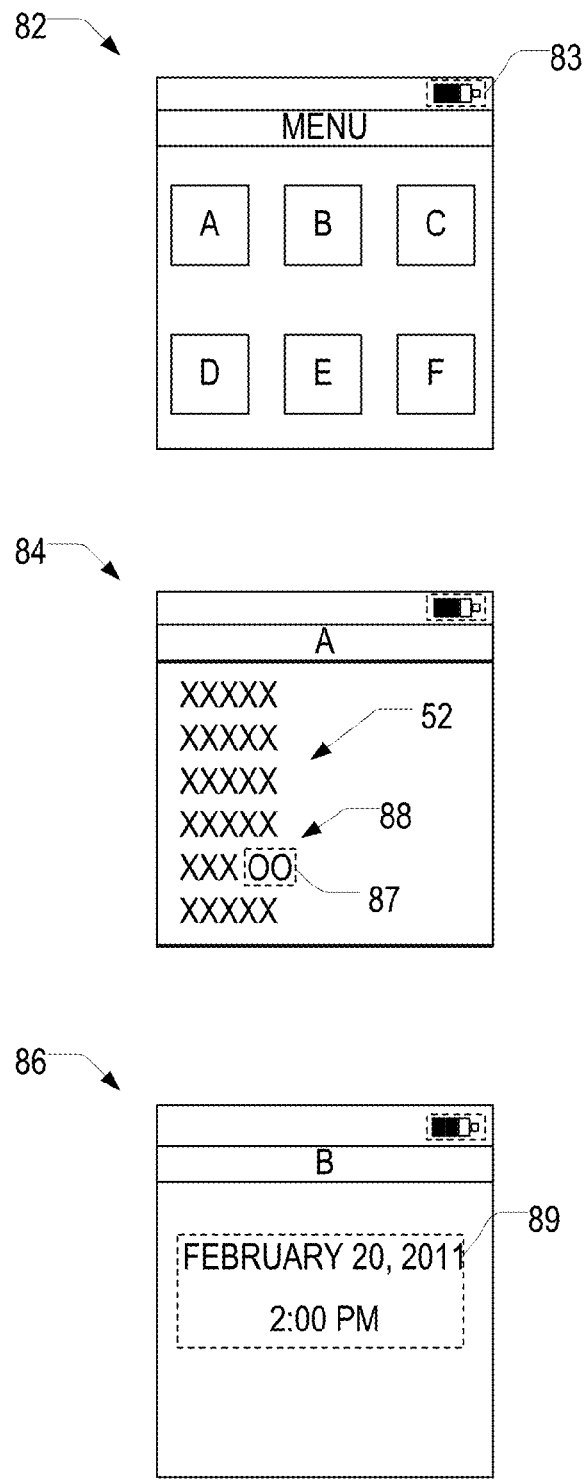
FIG. 7 is a schematic diagram of exemplary model images of GUI screens of one of the given mobile communication devices shown in FIG. 1.

Another test image, the test image 84 shown in FIG. 7, is then obtained of the second GUI screen at step 108.

After obtaining the test image 84, the test image 84 is compared to the corresponding model image, the model image 50, at step 110. In this embodiment, a pixel-by-pixel comparison is performed and the comparison detects that some of the pixels of the test image 84, as indicated by reference numeral 88 generally, are different from that of the model image 50. These differences might be noted by defining a frame 87 around the portion of the test image 84 that contains the differences. Similar to the test image 84, the excluded portion 54 in the model image 50 and the corresponding portion of the test image 84 are disregarded or ignored in the comparison such that any differences within the portions of the image do not effect the result of the comparison. The results of the comparison are then recorded.

The method determines whether there are additional images should be tested at step 112. As there is one additional model image, the model image 60, to be compared, the method returns to step 106 whereby yet another set of navigation instructions are executed to generate another GUI screen on the given device. Staying with the present example, the navigation instructions 74 are executed on the given device to generate a third GUI screen at step 106. The third GUI screen is the GUI screen captured in a test image 86.

A third test image, the test image 86 shown in FIG. 7, is then obtained of the second GUI screen at step 108.

After obtaining the test image 86, the test image 86 is compared to a corresponding model image, the model image 60, at step 110. Since the model image 60 comprises a variable portion 64, a corresponding variable portion 89 on the test image 86 is determined. Information about the pixels of the variable portions 64 and 89 are disregarded or ignored when the two images 40 and 86 are ignored. As such, even though the images 60 and 86 are showing different dates and times, the result of the comparison will not indicate that the images are different because the dates and times shown are within the variable portions 64 and 86 of the images 60 and 89 respectively. The result of the comparison is then recorded. In some embodiments, analysis on the variable portion 89 may be performed to verify the information contained therein.

The method 100 determines whether there are additional images to be tested at step 112. In the present example, since there are no additional images to be obtained the method now proceeds to step 114 whereby the results of the comparisons between the model images and the test images are reported. In this embodiment, since the test image 84 is not the same as the model image 50, the results would indicate that the user content of the test device is not the same as the content of the model device.

Figure 8:
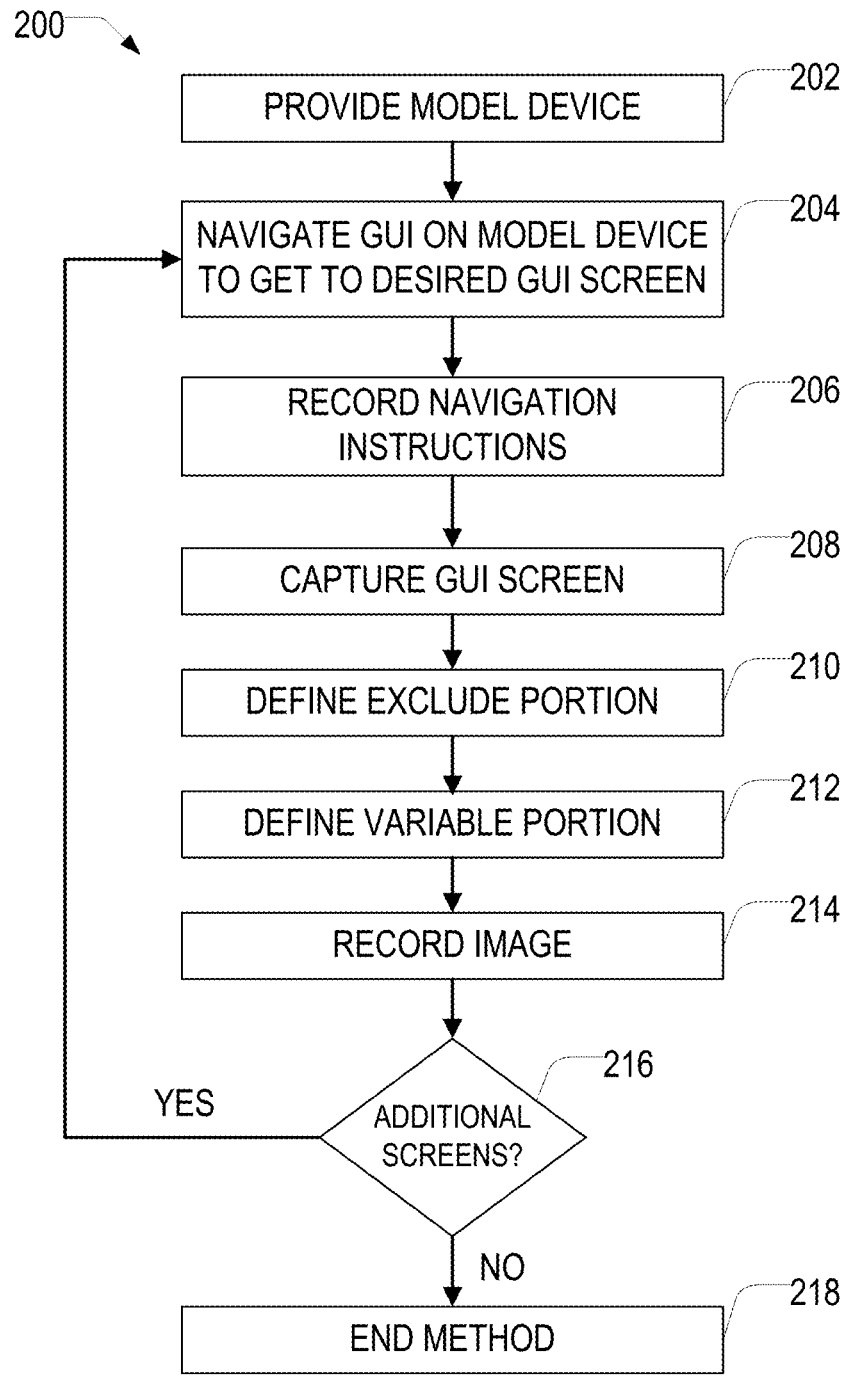
FIG. 8 is a block diagram of a method for generating at least one model image shown in FIG. 3.

Referring now to FIG. 8, illustrated therein is a method 200 for obtaining one or more model images from one or more model mobile communication devices. In some embodiments, one or more of the steps of the method 200 may be executed by a processor to generate one or more model images from model devices shown in system 10 and described herein above. In some embodiments, one or more of the steps of method 200 may be executed by one or more steps of the method 100 to provide one or more model images. The method 200 starts at step 202.

At step 202, a model mobile communication device having only desired content stored therein is provided. The model device has a plurality of GUI screens associated therewith and the plurality of GUI screens is indicative of the desired content stored in the device.

At step 204, the method 200 navigates the GUI screens of the model device to select one GUI screen of the GUI screens.

At step 206, the navigation instructions to navigate the GUI screens of the model device to select that GUI screen in step 204 are recorded.

At step 208, the GUI screen is captured to generate a model image associated with that GUI screen.

At step 210, zero or more exclude portions comprising a portion of the model image captured in step 208 is defined. In some embodiments, there may not be any exclude portions in the model image. In some embodiments, the exclude portion may be determined based on user input.

At step 212, zero or more variable portions comprising a portion of the model image captured in step 208 is determined. In some embodiments, the variable portion may be determined based on user input. In other embodiments, the variable portion may be determined without user input. For example, an optical character recognition could be applied to recognize times and dates formats and to designate portion of the image having such times and dates as being variable. In other embodiments, other means may be used to determine the variable portion of the test image. In some embodiments, the step 212 may further comprise determining a test function associated with the variable portion. The test function is indicative of a type of analysis to be performed on the variable portion to analyze information contained therein. For example, a test function could be optical character recognition based analysis.

At step 214, the model image with the exclude portion and variable portion if so determined at steps 210 and/or 212 is recorded. The model image comprises information about a plurality of the pixels of that GUI screen and indicative of at lest some of the desired content on the model device.

If there are more GUI screens to be captured on the model device, the method returns to step 204.

In some embodiments, performance of one or more of the steps of the above method is not necessary to generate one or more model images. For example, the navigation instructions need not be recorded to generate the model image. However, the navigation instructions may be useful to navigate through a corresponding given model device to be tested. In another example, steps 210, or 212 may not be applicable based on the specific GUI screen being captured. That is, there may not be any exclude portions or variable portions within a model image.

The foregoing aspects of the method and the electronic device are provided for exemplary purposes only. Those skilled in the art will recognize that various changes may be made thereto without departing from the spirit and scope of the method and the electronic device as defined by the appended claims.

The invention claimed is:

1. A computer-implemented method for testing user content of a previously-used mobile communication device, the method comprising:
   a) providing a previously-used mobile communication device, the mobile communication device storing content comprising visible content and non-visible content, the visible content being content that is visible on a screen of the previously-used mobile communication device;
   b) providing a plurality of model images associated with a plurality of graphical user interface GUI screens of a model mobile communication device corresponding to the plurality of GUI screens of the previously-used mobile communication device, the model mobile communication device having standard content stored therein, and the model images being indicative of the standard content of the model mobile communication device;
   c) providing navigation instructions for traversing through the plurality of GUI screens of the previously-used mobile communication device, the navigation instructions being pre-determined to accord with the plurality of GUI screens of the model communication device;
   d) executing the navigation instructions to traverse through the plurality of GUI screens of the previously-used mobile communication device;
   e) obtaining a test image for each of the plurality of GUI screens of the previously-used mobile communication device, the test image being indicative of the visible content of the previously-used mobile communication device;
   f) using a computer processor to determine whether the visible content comprises visible user content, the visible user content being personal information about a previous user of the previously-used mobile communication device, by comparing each of the test images to a corresponding model image of the plurality of model images provided;
   g) if the comparing indicates that the test image is not the same as the model image, recording that the previously-used mobile communication device contains some of the visible user content and is therefore unacceptable for re-use by a subsequent user; and
   h) if the comparing indicates that the test image is the same as the model image, recording that the previously-used mobile communications device does not contain any of the visible user content and is therefore acceptable for re-use by a subsequent user.

2. The method of claim 1, wherein at least one of the provided model images has an exclude portion that is immaterial to testing the visible user content of the previously-used mobile communication device, the excluded portion being within the test image and the method further comprises the steps of:
   a) determining an exclude portion of the test image corresponding to the exclude portion of the model image; and
   b) disregarding the exclude portion of the test image and the exclude portion of the model image when comparing the test image to the model image.

3. The method of claim 1, wherein at least one of the provided model image has a variable portion that varies based on context the variable portion being within the text image and the method further comprises the steps of:
   a) determining a variable portion of the test image corresponding to the variable portion of the model image; and
   b) excluding the variable portion of the test image and the variable portion of the model image when comparing the test image to the model image.

4. The method of claim 3, further comprising the step of examining the variable portion of the test image to verify information contained therein based on a context of the test image, the context being reflective of information existing in the variable portion when the test image was generated.

5. The method of claim 4, further comprising the steps of:
a) applying optical character recognition to the variable portion of the test image to determine the information contained therein; and
b) analyzing that information in the context of when the test image is obtained to verify whether the information is indicative of the context.

6. The method of claim 1, wherein the at least one of the model images is generated by:
a) providing the model mobile communication device having only standard content stored therein;
b) navigating the mobile communication device to arrive at the at least one GUI screen of the model mobile communication device; and
c) capturing that GUI screen to generate the at least one model image associated with that GUI screen.

7. The method of claim 6, further comprising the step of:
a) receiving user input indicative of a portion of the at least one model image that is immaterial to testing the visible user content of the previously-used mobile communication device; and
b) defining an exclude portion of the at least one model image based on the user input, the exclude portion being the portion of the at least one image that is immaterial to testing the visible user content of the previously-used mobile communication device.

8. The method of claim 6, further comprising the step of:
a) defining a variable portion of the at least one model image, the variable portion being a portion of the at least one model image that varies based on a context surrounding the generation of the at least one model image.

9. The method of claim 8, further comprising the step of:
a) defining a test function associated with the variable portion, the test function being indicative of a type of analysis to be performed on the variable portion to analyze information contained therein.

10. The method of claim 1, wherein the navigation instructions are generated from metadata associated with the mobile communication device.

11. The method of claim 1, wherein the step of comparing the model images with the test images comprises:
a) obtaining a first hash value based on at least one of the model images;
b) obtaining a second hash value based on at least one of the test images; and
c) comparing the first hash value to the second hash value.

12. The method of claim 1, wherein the step of comparing the test images with the model images comprises:
a) for each pixel of the plurality of pixels of at least one of the test image, comparing the information about that pixel to the information about a corresponding pixel of the plurality of pixels of at least one of the model images.

13. The method of claim 2, wherein the step of comparing the test images with the model images further comprises:
a) noting at least one pixel of at least one of the test image and the model image to indicate a difference between the test image and the model image.

14. A system for testing user content of a previously-used mobile communication device comprising:
a) at least one data storage device having:
i. a test agent comprising test agent instructions;
ii. a plurality of model images associated with a plurality of graphical user interface (GUI) screens of a model mobile communication device corresponding to the previously-used mobile communication device, the model mobile communication device having standard content stored therein, the model image being indicative of the standard content of the model mobile communication device; and
iii. navigation instructions for traversing through the plurality of GUI screens of the previously-used mobile communication device, the navigation instructions being pre-determined to accord with the plurality of GUI screens of the model mobile communication device;
b) at least one processor coupled to the at least one data storage device, the at least one processor adapted to execute the test agent instructions such that the at least one processor is operable to:
i. execute the navigation instructions to traverse through the plurality of GUI screens of the previously-used mobile communication device;
ii. obtain a test image for each of the plurality of GUI screens of the previously-used mobile communication device, the test image being indicative of the visible content of the previously-used mobile communication device;
iii. determine whether the visible content comprises visible user content, the visible user content being personal information about a previous user of the previously-used mobile communication device, by comparing each of the test images to a corresponding model image of the plurality of model images provided;
iv. if the comparing indicates that the test image is not the same as the model image, record that the previously-used mobile communication device contains some of the visible user content and is therefore unacceptable for re-use by a subsequent user; and
v. if the comparing indicates that the test image is the same as the model image, record that the previously-used mobile communications device does not contain any of the visible user content and is therefore acceptable for re-use by the subsequent user.

15. The system of claim 14, wherein the at least one processor is a mobile processor on a mobile communication device.

16. The system of claim 14, wherein the test agent and the at least one model image is transmitted to the data storage device from a coordinating computer.

17. The system of claim 14, wherein the at least one model image is transmitted to the data storage device from a server over a network.

18. The system of claim 14, wherein the previously-used mobile communication device is at least one of a tablet computer and a smart phone.

19. A non-transitory computer readable medium comprising instructions for testing user content of a previously-used mobile communication device, the instructions executable by at least one processor to:
a) provide a plurality of model images associated with a plurality of graphical user interface (GUI) screens of a model mobile communication device corresponding to the previously-used mobile communication device, the model mobile communication device having standard content stored therein, and the model images being indicative of the standard content of the model mobile communication device;
b) provide navigation instructions for traversing through the plurality of GUI screens of the previously-used mobile communication device, the navigation instructions being pre-determined to accord with the plurality of GUI screens of the model mobile communication device;

c) execute the navigation instructions to traverse through the plurality of GUI screens of the previously-used mobile communication device;
d) obtain a test image for each of the plurality of GUI screens of the previously-used mobile communication device, the test image being indicative of the visible content of the previously-used mobile communication device;
e) determine whether the visible content comprises visible user content, the visible user content being personal information about a previous user of the previously-used mobile communication device, by comparing each of the test images to a corresponding model image of the plurality of model images provided;
f) if the comparing indicates that the test image is not the same as the model image, record that the previously-used mobile communication device contains some of the visible user content and is therefore unacceptable for re-use by a subsequent user; and
g) if the comparing indicates that the test image is the same as the model image, record that the previously-used mobile communications device does not contain any of the visible user content and is therefore acceptable for re-use by a subsequent user.

* * * * *